(12) United States Patent
Zalewski

(10) Patent No.: US 9,914,048 B2
(45) Date of Patent: *Mar. 13, 2018

(54) METHODS AND APPARATUSES FOR RECORDING AND UTILIZING AN AUDIO SIGNATURE WITHIN AN APPLICATION

(71) Applicant: Sony Interactive Entertainment America LLC, San Mateo, CA (US)

(72) Inventor: Gary Zalewski, Oakland, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,939

(22) Filed: May 30, 2017

(65) Prior Publication Data
US 2017/0259168 A1 Sep. 14, 2017

Related U.S. Application Data

(63) Continuation of application No. 12/233,370, filed on Sep. 18, 2008, now Pat. No. 9,662,578.

(60) Provisional application No. 60/994,736, filed on Sep. 21, 2007.

(51) Int. Cl.
| A63F 9/24 | (2006.01) |
| A63F 13/215 | (2014.01) |
| A63F 13/424 | (2014.01) |
| A63F 13/79 | (2014.01) |
| A63F 13/87 | (2014.01) |

(52) U.S. Cl.
CPC .......... *A63F 13/215* (2014.09); *A63F 13/424* (2014.09); *A63F 13/79* (2014.09); *A63F 13/87* (2014.09); *A63F 2300/1081* (2013.01); *A63F 2300/572* (2013.01); *A63F 2300/6072* (2013.01)

(58) Field of Classification Search
CPC ...... A63F 13/12; A63F 13/215; A63F 13/424; A63F 13/79; A63F 2300/1081; A63F 2300/5546; A63F 2300/572
USPC .............................................. 463/35, 29, 43
See application file for complete search history.

(56) References Cited

U.S. PATENT DOCUMENTS

| 5,511,187 A * | 4/1996 | Cragun ................. G06Q 10/10 704/270.1 |
| 5,860,861 A * | 1/1999 | Lipps ..................... A63F 13/06 273/148 B |
| 5,993,318 A * | 11/1999 | Kousaki ................. A63F 13/10 434/69 |

(Continued)

*Primary Examiner* — Michael Cuff
(74) *Attorney, Agent, or Firm* — Martine Penilla Group, LLP

(57) ABSTRACT

A method for handling communication for a computer game is provided. Once example method includes executing the computer game for game play by a user. The computer game has an interface for recording audio signatures to use during game play based specific qualifying events. During game play, the method detects that a qualifying event has occurred by examining metadata associated with the game play. The method includes generating a message in response to detecting the qualifying event. The message is configured to include an audio signature that was associated with the qualifying event. Then, transmit the message including the audio signature to a predefined recipient that is playing the computer game via a second computing device. The audio signature is output by a speaker associated with the second computing device upon receiving the message.

20 Claims, 7 Drawing Sheets

(56) References Cited

U.S. PATENT DOCUMENTS

| | | | | |
|---|---|---|---|---|
| 6,183,367 B1* | 2/2001 | Kaji | ............... | A63F 13/12 345/418 |
| 6,241,612 B1* | 6/2001 | Heredia | ............... | A63F 13/12 463/40 |
| 6,296,570 B1* | 10/2001 | Miyamoto | ............... | A63F 13/10 463/30 |
| 6,306,039 B1* | 10/2001 | Kaji | ............... | A63F 13/12 345/418 |
| 6,379,253 B1* | 4/2002 | Nishioka | ............... | A63F 13/10 273/148 B |
| 6,544,122 B2* | 4/2003 | Araki | ............... | A63F 13/10 381/123 |
| 6,676,523 B1* | 1/2004 | Kasai | ............... | A63F 13/10 273/148 R |
| 7,090,582 B2* | 8/2006 | Danieli | ............... | A63F 13/12 463/35 |
| 7,162,036 B2* | 1/2007 | Rowe | ............... | G06F 21/57 380/251 |
| 7,208,669 B2* | 4/2007 | Wells | ............... | A63F 13/12 463/35 |
| 7,240,093 B1* | 7/2007 | Danieli | ............... | A63F 13/12 463/35 |
| 7,367,888 B1* | 5/2008 | Chen | ............... | A63F 13/12 463/1 |
| 7,389,153 B2* | 6/2008 | Giaimo | ............... | A63F 13/12 381/123 |
| 7,613,689 B2* | 11/2009 | Arrouye | ............... | G06F 17/30067 |
| 7,630,971 B2* | 12/2009 | Arrouye | ............... | G06F 17/301 |
| 7,663,045 B2* | 2/2010 | Schmidt | ............... | A63F 13/10 463/35 |
| 7,676,034 B1* | 3/2010 | Wu | ............... | H04M 3/5233 379/265.01 |
| 7,682,237 B2* | 3/2010 | Ueshima | ............... | A63F 13/08 463/35 |
| 7,698,447 B2* | 4/2010 | Fujisawa | ............... | A63F 13/12 370/352 |
| 7,867,088 B2* | 1/2011 | Prum | ............... | A63F 13/10 463/37 |
| 7,985,138 B2* | 7/2011 | Acharya | ............... | A63F 13/12 463/42 |
| 8,012,003 B2* | 9/2011 | Sterchi | ............... | A63F 13/10 463/2 |
| 8,070,607 B2* | 12/2011 | Takahashi | ............... | A63F 13/10 273/293 |
| 8,123,618 B2* | 2/2012 | Karmarkar | ............... | G07F 17/32 463/10 |
| 8,585,507 B2* | 11/2013 | Jennings | ............... | G06F 17/30 463/41 |
| 2007/0061142 A1* | 3/2007 | Hernandez-Abrego | ............... | G10L 17/04 704/247 |
| 2007/0155494 A1* | 7/2007 | Wells | ............... | A63F 13/12 463/35 |
| 2011/0078172 A1* | 3/2011 | LaJoie | ............... | G06F 17/30775 707/769 |

\* cited by examiner

METHODS AND APPARATUSES FOR RECORDING AND UTILIZING AN AUDIO SIGNATURE WITHIN AN APPLICATION

CLAIM OF PRIORITY

This application is a continuation of U.S. patent application Ser. No. 12/233,370, filed on Sep. 18, 2008, which claims priority to U.S. Provisional Patent Application No. 60/994,736, filed Sep. 21, 2007, each of which is incorporated by reference herein.

FIELD OF THE INVENTION

The present invention relates generally to an audio signatures and, more particularly, to recording and utilizing an audio signature within an application.

BACKGROUND

Interactive applications such as video games and computer games allow multiple participants to interact with each other. During these interactive applications, participants typically perform acts that are graphically shown on a display device and are audibly heard through a sound device for all other participants to see and hear, respectively.

When multiple participants participate in exchanging audible messages, it can get confusing to accurately identify the sender of the audible message. In some instances, participants can reveal their identities to other participants by audibly repeating their name during an audible communication. For example, while a participant transits an audible message to other participants, the participant may desire to remind the recipient participants of his/her identity.

Further, there are circumstances and events during the interactive applications that would be beneficial to allow participants to broadcast more customized audible messages to other participants.

SUMMARY

In one embodiment, the methods and apparatuses detect an application, detect a participant that is utilizing the application, detect a qualifying event, and transmit an audio signature associated with the participant to a recipient wherein the recipient utilizes the application.

In another embodiment, a method for handling communication for a computer game is provided. The method includes executing the computer game for game play by a user. The computer game has an interface for recording audio signatures to use during game play based specific qualifying events. During game play, the method detects that a qualifying event has occurred by examining metadata associated with the game play. The method includes generating a message in response to detecting the qualifying event. The message is configured to include an audio signature that was associated with the qualifying event. Then, transmit the message including the audio signature to a predefined recipient that is playing the computer game via a second computing device. The audio signature is output by a speaker associated with the second computing device upon receiving the message.

BRIEF DESCRIPTION OF THE DRAWINGS

The accompanying drawings, which are incorporated in and constitute a part of this specification, illustrate and explain one embodiment of the methods and apparatuses for recording and utilizing an audio signature within an application. In the drawings.

DETAILED DESCRIPTION

The following detailed description of the methods and apparatuses for recording and utilizing an audio signature within an application refers to the accompanying drawings. The detailed description is not intended to limit the methods and apparatuses for recording and utilizing an audio signature within an application.

Instead, the scope of the methods and apparatuses for recording and utilizing an audio signature within an application is defined by the appended claims and equivalents. Those skilled in the art will recognize that many other implementations are possible, consistent with the methods and apparatuses for recording and utilizing an audio signature within an application.

References to "electronic device" include a device such as a personal digital video recorder, digital audio player, gaming console, a set top box, a radio, a television, a personal computer, a cellular telephone, a personal digital assistant, and the like.

References to "participant" include a representation of a player within a video game, a computer game, and the like. In one embodiment, the participant is a player that is controlled by an operator of an electronic device. In another embodiment, the participant is a player that is controlled by an electronic device.

References to "content" include audio streams, images, video streams, photographs, graphical displays, text files, software applications, electronic messages, video games including associated player data, and the like.

References to "application" include a video game, an on-line game through the internet, a computer game, and the like.

In one embodiment, an audio signature is utilized by a participant to customize communication from the participant to other participants. Although the initial communication by the participant may include both audio and non-audio communications, the audio signature is an audio representation that is chosen by the participant. In one embodiment, the audio signature is transmitted based on a qualifying event. In some instances, a participant is able to more effectively communicate with other participants by transmitting the audio signature. In one embodiment, the audio signature belonging to the participant is utilized to uniquely identify the participant among a plurality of participants while utilizing an application.

Figure 1:
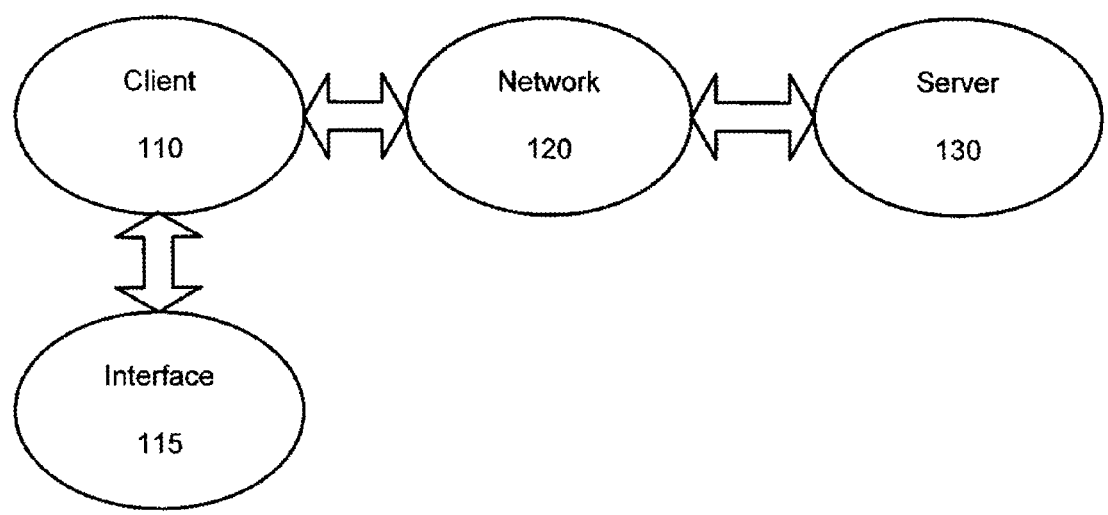
FIG. 1 is a diagram illustrating an environment within which the methods and apparatuses for recording and utilizing an audio signature within an application are implemented.

FIG. 1 is a diagram illustrating an environment within which the methods and apparatuses for recording and utilizing an audio signature within an application are implemented. The environment includes an electronic device 110 (e.g., a computing platform configured to act as a client device, such as a personal digital video recorder, digital audio player, computer, a personal digital assistant, a cellular telephone, a camera device, a set top box, a gaming console), a user interface 115, a network 120 (e.g., a local area network, a home network, the Internet), and a server 130 (e.g., a computing platform configured to act as a server). In one embodiment, the network 120 can be implemented via wireless or wired solutions.

In one embodiment, one or more user interface 115 components are made integral with the electronic device 110 (e.g., keypad and video display screen input and output interfaces in the same housing as personal digital assistant electronics (e.g., as in a Clie® manufactured by Sony Corporation). In other embodiments, one or more user interface 115 components (e.g., a keyboard, a pointing device such as a mouse and trackball, a microphone, a speaker, a display, a camera) are physically separate from, and are conventionally coupled to, electronic device 110. The user utilizes interface 115 to access and control content and applications stored in electronic device 110, server 130, or a remote storage device (not shown) coupled via network 120.

In accordance with the invention, embodiments for recording and utilizing an audio signature within an application as described below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
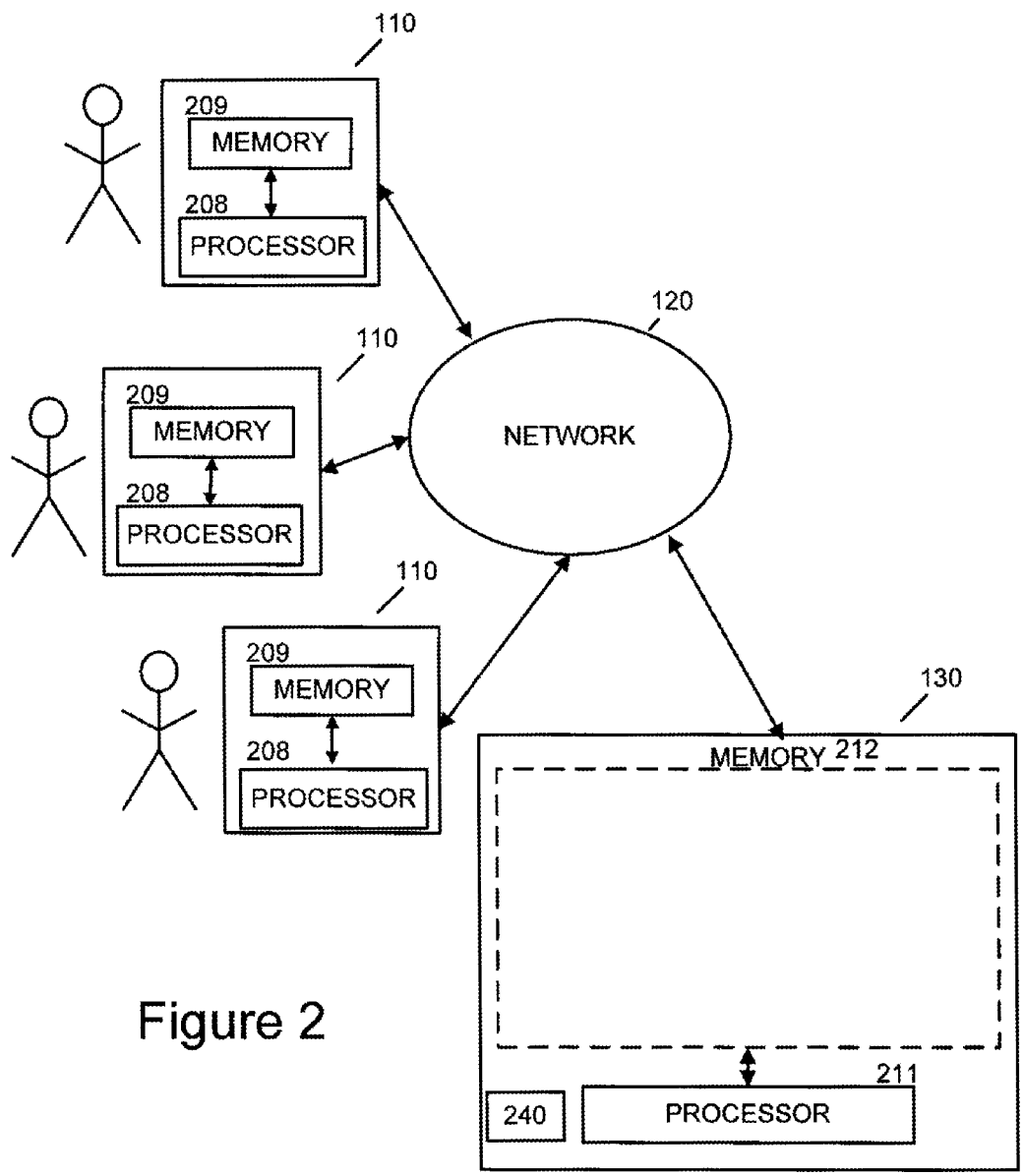
FIG. 2 is a simplified block diagram illustrating one embodiment in which the methods and apparatuses for recording and utilizing an audio signature within an application are implemented.

FIG. 2 is a simplified diagram illustrating an exemplary architecture in which the methods and apparatuses for recording and utilizing an audio signature within an application are implemented. The exemplary architecture includes a plurality of electronic devices 110, a server device 130, and a network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. A unique user operates each electronic device 110 via an interface 115 as described with reference to FIG. 1.

Server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

The plurality of client devices 110 and the server 130 include instructions for a customized application for recording and utilizing an audio signature within an application. In one embodiment, the plurality of computer-readable medium 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

One or more user applications are stored in memories 209, in memory 211, or a single user application is stored in part in one memory 209 and in part in memory 211. In one instance, a stored user application, regardless of storage location, is made customizable based on selectively communicating based on a location and event as determined using embodiments described below.

Figure 3:
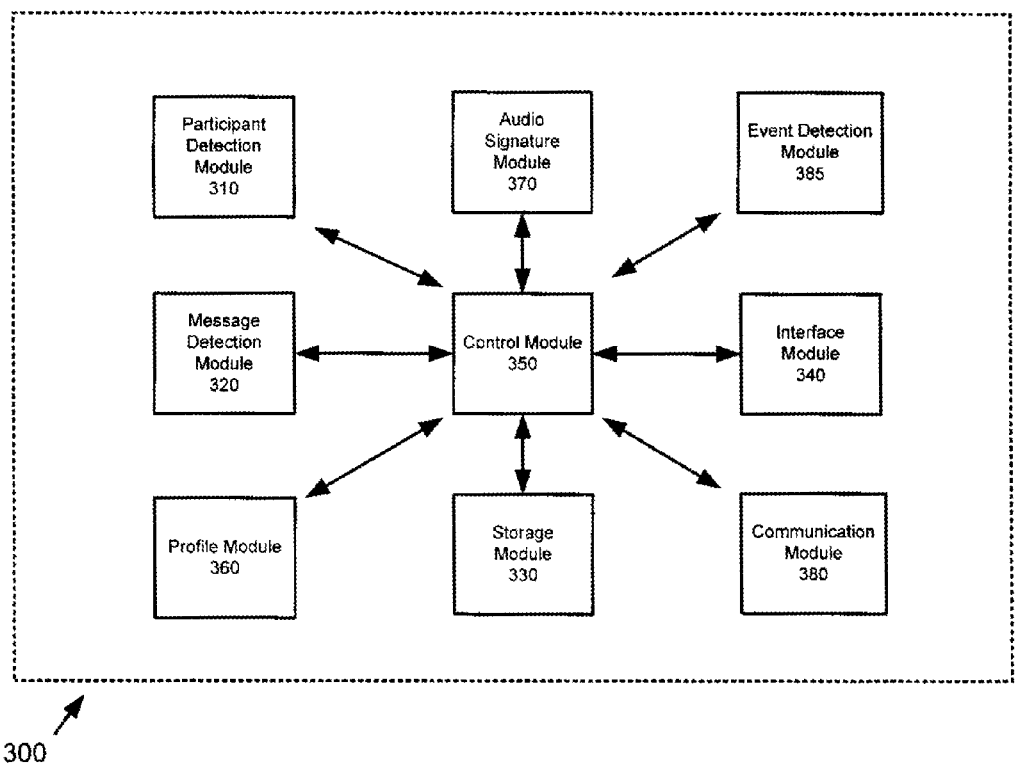
FIG. 3 is a simplified block diagram illustrating a system, consistent with one embodiment of the methods and apparatuses for recording and utilizing an audio signature within an application.

FIG. 3 illustrates one embodiment of a system 300 for recording and utilizing an audio signature within an application. The system 300 includes a participant detection module 310, a message detection module 320, a storage module 330, an interface module 340, a control module 350, a profile module 360, an audio signature module 370, a communication module 380, and an event detection module 385.

In one embodiment, the control module 350 communicates with the participant detection module 310, the message detection module 320, the storage module 330, the interface module 340, the profile module 360, the audio signature module 370, the communication module 380, and the event detection module 385.

In one embodiment, the control module 350 coordinates tasks, requests, and communications between the participant detection module 310, the message detection module 320, the storage module 330, the interface module 340, the profile module 360, the audio signature module 370, the communication module 380, and the event detection module 385.

In one embodiment, the participant detection module 310 detects participants. In one embodiment, the participants are represented by players within a video game. For example, the players within the video game may be controlled by the gaming console or may be controlled by an operator of the gaming console. In one embodiment, the participant detection module 310 simultaneously detects multiple participants. In one instance, each of the participants may be controlled by a different gaming console such that multiple gaming consoles are utilized simultaneously to control the multiple participants.

In one embodiment, the message detection module 320 detects a message from one of the participants that are detected by the participant detection module 310. In one embodiment, the message includes an audio signal. In one embodiment, the message detection module 320 also detects the length of the message. In another embodiment, the message detection module 320 also detects a frequency in the number of messages originating from a particular participant.

In one embodiment, the storage module 330 stores a plurality of profiles wherein each profile is associated with a particular application and participants and associated parameters related to the participants. In one embodiment, the profile stores exemplary information as shown in a profile illustrated in FIG. 4. In one embodiment, the storage module 330 is located within the server device 130. In another embodiment, portions of the storage module 330 are located within the electronic device 110.

In one embodiment, the interface module 340 detects the electronic device 110 as the electronic device 110 is connected to the network 120.

In another embodiment, the interface module 340 detects input from the interface device 115 such as a keyboard, a mouse, a microphone, a still camera, a video camera, and the like.

In yet another embodiment, the interface module 340 provides output to the interface device 115 such as a display, speakers, external storage devices, an external network, and the like.

In one embodiment, the profile module 360 processes profile information related to the specific content and each specific participant. In one embodiment, exemplary profile information is shown within a record illustrated in FIG. 4. In one embodiment, each profile corresponds with a particular application. For example, the application is a video game in one embodiment. In another embodiment, each profile corresponds with a particular participant.

In one embodiment, the audio signature module 370 manages the audio signature that is associated with each participant. In one embodiment, each participant has at least one unique audio signature. In one embodiment, the audio signature includes an audio signal.

In one embodiment, the communication module 380 selectively allows the audio signature to be broadcasted to other participants based on a qualifying event. For example, when a qualifying event is detected, then the participants that receive a message also receive the audio signature associated with the sender of the message.

In one embodiment, the message from one of the participants to other participants is an audio communication such as a telephone call. In another embodiment, the message from one of the participants to other participants is a video communication such as a webcam session. In another embodiment, the message from one of the participants to other participants is a textual communication such as instant messaging.

In one embodiment, the duration of the message between the participants can range from a few seconds to multiple minutes. Based on the qualifying event, the audio signature associated with the sending participant is selectively sent to the recipients of the message.

In one embodiment, the qualifying event is described within the record 400 as a profile. In one embodiment, the qualifying event includes an action by one of the participants such as requesting the audio signature be played, sending a message to recipients, communicating with other participants, discharging a pretend weapon, scoring a goal, basket, or touchdown, incapacitating another participant, making contact with another participant within the video game, and the like.

In one embodiment, the qualifying events may be limited in frequency. In one example, if the participant initiates a request to transmit the audio signature more than once every 30 seconds, requests that occur less than 30 seconds apart are disregarded. In another example, different frequencies for a qualifying event may be utilized.

In one embodiment, the event detection module 385 monitors the application and detects events that occur during the course of utilizing the application. In one embodiment, the event detection module 385 detects a qualifying event as it occurs while utilizing the application.

By limiting the frequency of the qualifying events, the frequency that the audio signature is utilized will be controlled. Further, this can prevent overuse and abuse of the audio signature by the participants.

The system 300 in FIG. 3 is shown for exemplary purposes and is merely one embodiment of the methods and apparatuses for recording and utilizing an audio signature within an application. Additional modules may be added to the system 300 without departing from the scope of the methods and apparatuses for recording and utilizing an audio signature within an application. Similarly, modules may be combined or deleted without departing from the scope of the methods and apparatuses for recording and utilizing an audio signature within an application.

Figure 4:
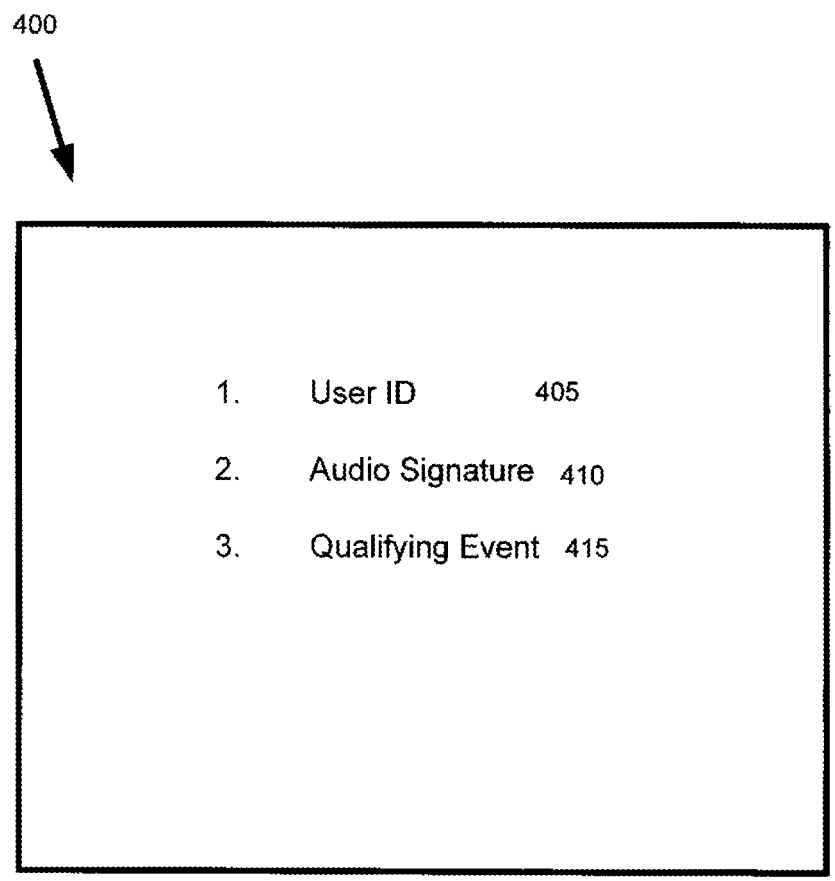
FIG. 4 illustrates an exemplary record consistent with one embodiment of the methods and apparatuses for recording and utilizing an audio signature within an application.

FIG. 4 illustrates a simplified record 400 that corresponds to a profile that describes an audio signature associated with a participant. In one embodiment, the record 400 is stored within the storage module 330 and utilized within the system 300. In one embodiment, the record 400 includes a user identification field 405, an audio signature field 410, and a qualifying event field 415.

In one embodiment, the user identification field 405 identifies a specific participant associated with the record 400. In one example, the participant's name is utilized as a label for the user identification field 405.

In one embodiment, the audio signature field 410 includes a reference to the audio signature that is associated with the participant.

In one embodiment, the qualifying event field 415 identifies various events that would trigger the broadcast of the audio signature to other participants. In one embodiment, an exemplary qualifying event includes a request by the participant in broadcasting the audio signature, communicating with other participants, success in hitting a target, scoring a goal, scoring a touchdown, capturing a target, eliminating a target, and the like.

Figure 5:
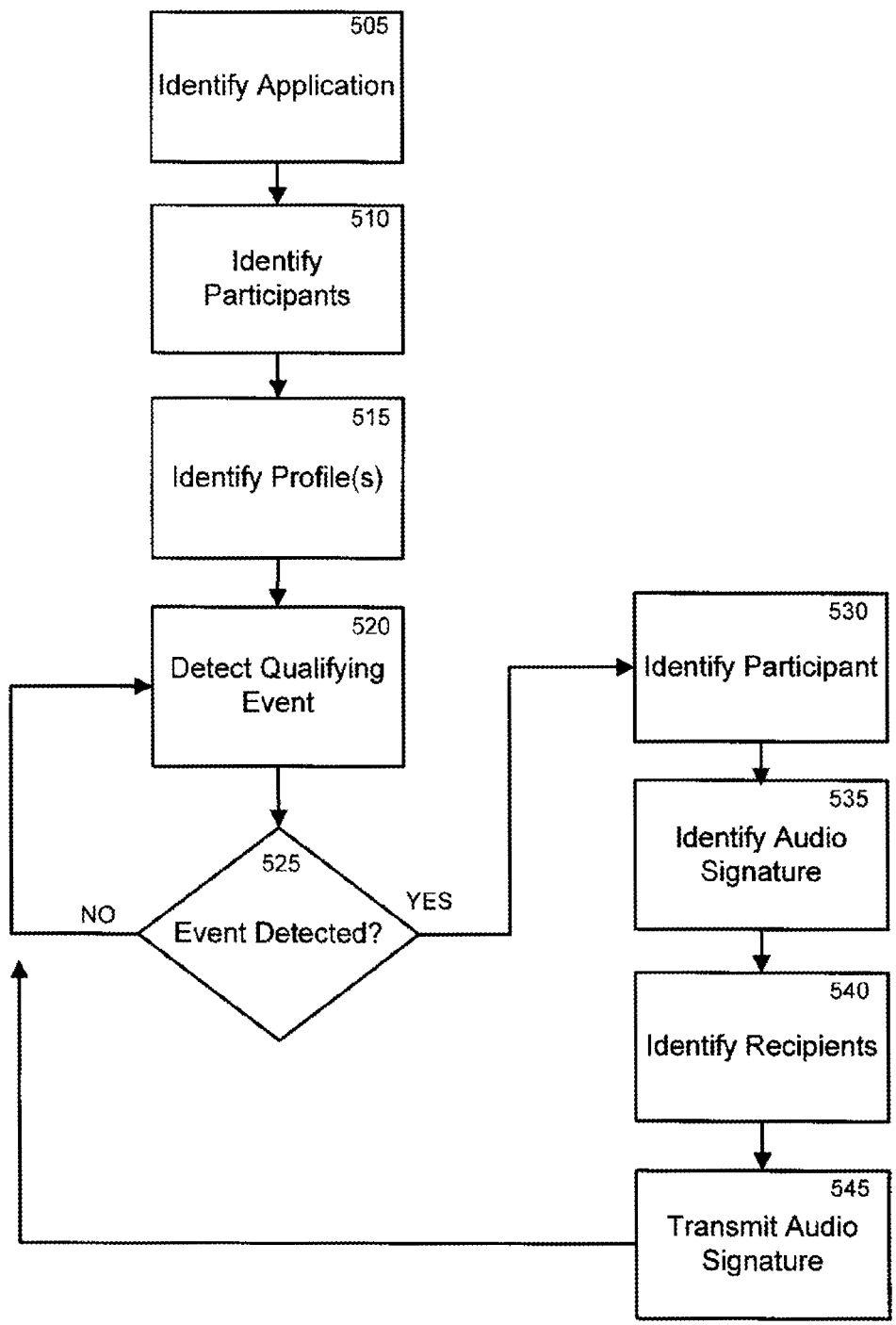
FIG. 5 is a flow diagram consistent with one embodiment of the methods and apparatuses for recording and utilizing an audio signature within an application.
Figure 6:
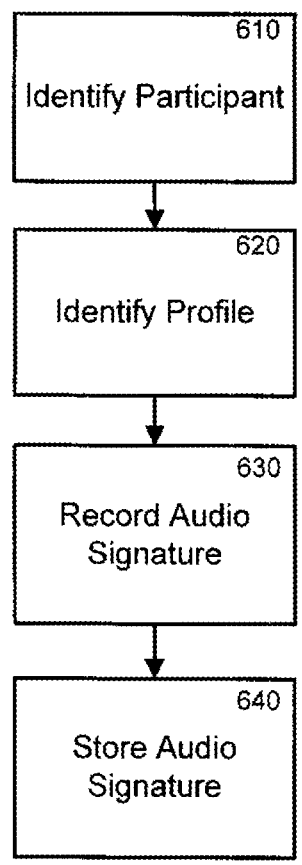
FIG. 6 is a flow diagram consistent with one embodiment of the methods and apparatuses for recording and utilizing an audio signature within an application.
Figure 7:
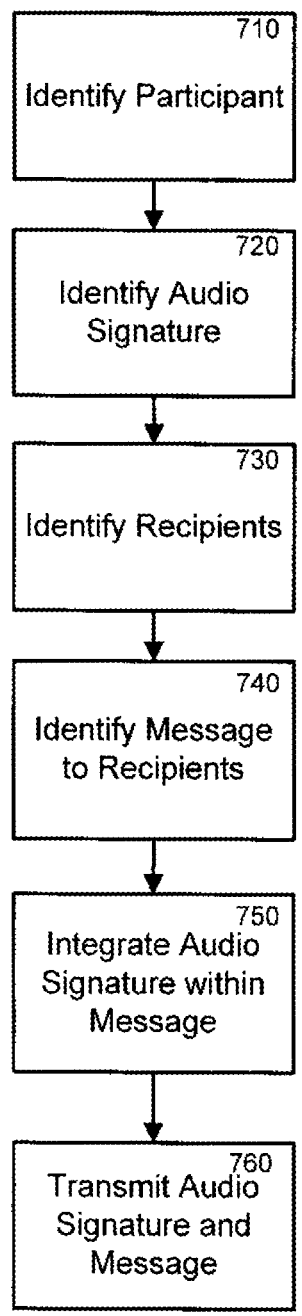
FIG. 7 is a flow diagram consistent with one embodiment of the methods and apparatuses for recording and utilizing an audio signature within an application.

The flow diagrams as depicted in FIGS. 5, 6, and 7 are one embodiment of the methods and apparatuses for recording and utilizing an audio signature within an application. The blocks within the flow diagrams can be performed in a different sequence without departing from the spirit of the methods and apparatuses for recording and utilizing an audio signature within an application. Further, blocks can be deleted, added, or combined without departing from the spirit of the methods and apparatuses for recording and utilizing an audio signature within an application.

The flow diagram in FIG. 5 illustrates selectively transmitting the audio signature to other participants according to one embodiment of the invention.

In Block 505, the application is identified. In one embodiment, specific application such as a specific video game is detected and identified. In one embodiment, the specific video game may be selected from a plurality of content. Further, the plurality of applications may include multiple types of content such as video games, computer games, and interactive content, and the like. In one embodiment, the plurality of content is stored within the storage module 330.

In Block 510, participants are identified. In one embodiment, the participants are utilizing the application as identified within the Block 505. In one embodiment, each participant is located in a remote location relative to each participant.

In Block 515, a profile corresponding with each of the identified participants within the Block 510 is identified. An exemplary profile is illustrated as record 400 within FIG. 4. In one embodiment, some participants may not have a corresponding profile. In the event that a corresponding profile that is unique to the identification application is not found or identified, a general profile may be identified as a substitute in one embodiment.

In Block 520, a qualifying event is detected. In one embodiment, a qualifying event is listed within a profile identified within the Block 515. In one embodiment, the events occurring within the application are monitored. In one embodiment, the events that are monitored are initiated by one of the participants. In another embodiment, the events that are monitored are initiated by the application.

In Block 525, a determination is made on whether a qualifying event is detected.

If there is no qualifying event detected, then additional detection is performed within the Block 520.

If there is a qualifying event detected, then a participant is identified detected within Block 530. In one embodiment, the participant that is identified is associated with the qualifying event. For example, having the detected participant initiate a request to transmit the audio signature is a qualifying event. In another example, having the detected participant initiate a message with another participant is a qualifying event. In yet another example, having the detected participant receive a message initiated by another participant is a qualifying event. In yet another example, having the detected participant score a goal, accomplish a task, and the like is a qualifying event.

In one embodiment, the qualifying events may be limited in frequency. For example, if a participant performs an act that would be usually deemed a qualifying event, a limit of how many qualifying events per period of time may be imposed. In one embodiment, a qualifying event may occur only once every 30 seconds. In this embodiment, if the participant initiates a request to transmit the audio signature more than once every 30 seconds, requests that occur less than 30 seconds apart are disregarded.

In Block 535, an audio signature is identified. In one embodiment, the identified audio signature corresponds with the profile associated with the participant identified within the Block 530. In one embodiment, the audio signature is customized by the identified participant.

In Block 540, participants are identified to receive the audio signature. In one embodiment, a participant is identified based on the qualifying event. For example, if scoring a goal in a game is a qualifying event and the goal is scored by a participant, then this participant that scored the goal is identified. In a similar example, a participant that assists in scoring the goal may also be identified.

In another embodiment, every participant within the vicinity of the qualifying event is also identified. For example, if scoring a goal in a game is a qualifying event, then all participants within the area of the goal being scored are identified.

In another embodiment, every participant that is in communication with the identified participant is also identified. For example, every participant that receives a message from the identified participant is also identified.

In yet another embodiment, every participant within the application during a qualifying event is also identified. For example, if scoring a goal in a game is a qualifying event, then all participants within the application when the goal is scored are identified.

Based on the identified participant, other participants that are within a predetermined distance of the identified participant are considered to be within a group with the identified participant.

In Block 545, the audio signature identified within the Block 535 is transmitted to the recipients identified within the Block 530. In one embodiment, the audio signature is transmitted through an audio communication channel such as voice call. In yet another embodiment, the audio signature is transmitted through a video communication channel such as a webcam session.

In one example, the application may be a soccer game utilizing a video game console. In this example, there are two teams. As two competing participants on different teams are near each other, one of these participants scores a goal against the other participant's team. In one embodiment, both these participants would not ordinarily communicate with each other. However, in one embodiment, scoring the goal is a qualifying event and both participants are within the predetermined distance from each other. In one embodiment, the participant scoring the goal is the identified participant. Accordingly, the identified participant transmits the audio signature to the other participant.

The preceding example illustrates one embodiment. Another embodiment includes an action/adventure game having multiple teams where the qualifying event may be striking a participant on the opposite team. Further, in other embodiments, different variations of games may be included with variations in the qualifying events.

In another embodiment, the identified participant submits a request to distribute the participant's audio signature to other participants. In one example, the request to distribute the audio signature by the identified participant is the qualifying event. In another example, the request to distribute the audio signature along with another attribute such as the frequency of the request is utilized to determine whether the qualifying event is satisfied.

In another embodiment, the identified participant transmits a message to a recipient. Based on the length of the message, transmitting the message is a qualifying event in one embodiment. In one example, if the identified recipient transmits a message lasting longer than 5 seconds, transmitting this message serves as a qualifying event. Further, the audio signature can be automatically transmitted with the message to the recipient in one embodiment. In another example, multiple audio signatures may be inserted within each message such as at the beginning and end of the message or at multiple times during the message.

The flow diagram in FIG. 6 illustrates recording an audio signature according to one embodiment of the invention.

In Block 610, a participant is identified.

In Block 620, a profile corresponding with the identified participant within the Block 610 is identified. An exemplary profile is illustrated as record 400 within FIG. 4.

In Block 630, an audio signature for the identified participant is recorded. In one embodiment, the audio signature includes information that represents an audio signal. In one embodiment, the audio signal is formed by the participant through an audio capture device such as a microphone or through an audio generation device such as an electronic keyboard.

In Block 640, the audio signature is stored. In one embodiment, the audio signature is stored within the exemplary profile as illustrated as record 400 within FIG. 4.

The flow diagram in FIG. 7 illustrates selectively transmitting the audio signature to other participants according to one embodiment of the invention.

In Block 710, a participant is identified.

In Block 720, an audio signature is identified that corresponds with the participant identified within the Block 710. In one embodiment, the identified audio signature corresponds with the profile associated with the participant identified within the Block 710. In one embodiment, the audio signature is customized by the identified participant.

In Block 730, participants are identified to receive the audio signature. In one embodiment, a participant is identified based on the qualifying event. For example, if scoring a goal in a game is a qualifying event and the goal is scored by a participant, then this participant that scored the goal is identified. In a similar example, a participant that assists in scoring the goal may also be identified.

In another embodiment, every participant within the vicinity of the qualifying event is also identified. For example, if scoring a goal in a game is a qualifying event, then all participants within the area of the goal being scored are identified.

In another embodiment, every participant that is in communication with the identified participant is also identified. For example, every participant that receives a message from the identified participant is also identified.

In yet another embodiment, every participant within the application during a qualifying event is also identified. For example, if scoring a goal in a game is a qualifying event, then all participants within the application when the goal is scored are identified.

Based on the identified participant, other participants that are within a predetermined distance of the identified participant are considered to be within a group with the identified participant.

In Block 740, a message is identified as being sent by the identified participant to the recipient. In one embodiment, the message is an audio message. In another embodiment, the message is a video message with an audio component.

In Block 750, the audio signature is integrated with the message. In one embodiment, the audio signature precedes the message. In another embodiment, the audio signature follows the message. In yet another embodiment, the audio signature is inserted within the message. In yet another embodiment, multiple instances of the audio signature are inserted within the message.

In Block 740, the audio signature and the message are transmitted to the recipients identified within the Block 730. In one embodiment, the audio signature and message are transmitted through an audio communication channel such as voice call. In yet another embodiment, the audio signature and the message are transmitted through a video communication channel such as a webcam session.

The foregoing descriptions of specific embodiments of the invention have been presented for purposes of illustration and description. For example, the invention is described within the context of for recording and utilizing an audio signature within an application as merely one embodiment of the invention. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method for handling communication for a computer game, comprising:
    executing, by a first computing device, the computer game for game play by a user, the computer game having an interface for recording audio signatures to use during game play based on specific qualifying events;
    during game play, detecting by the first computing device that a qualifying event has occurred by examining metadata associated with the game play;
    generating, by the first computing device, a message in response to detecting the qualifying event, the message is configured to include an audio signature that was associated with the qualifying event; and
    transmitting, by the first computing device, the message including the audio signature to a predefined recipient that is playing the computer game via a second computing device, such that the audio signature is output by a speaker associated with the second computing device upon receiving the message.

2. The method of claim 1, wherein the first computing device and the second computing device play the computer game in a multi-participant mode.

3. The method of claim 2, wherein the transmitting of the message is a broadcast to the second computing device and at least one other computing device.

4. The method of claim 1, wherein the first computing device and the second computing device play the computer game over a network.

5. The method of claim 1, wherein the first computing device and the second computing device communicate with a server, the server is configured to manage or execute at least part of the computer game.

6. The method of claim 1, wherein the qualifying event is associated with an action performed by the user during game play.

7. The method of claim 6, wherein the action performed by the user during game play includes discharging a pretend weapon, scoring a goal, scoring a basket, scoring a touchdown, accomplishing a task, incapacitating another participant, or making contact with another participant.

8. The method of claim 6, wherein the action performed by the user during game play includes requesting that the audio signature be played to another participant, communicating with another participant, or sending a textual message to another participant.

9. The method of claim 1, further comprising:
    generating one or more additional messages in response to detecting the qualifying event, each of the one or more additional messages configured to include the audio signature associated with the qualifying event; and
    transmitting the one or more messages including the audio signature to one or more additional predefined recipients that are playing the computer game via respective computing devices, the audio signature is output by respective speakers associated with the respective computing device of the one or more additional predefined recipients upon receiving the one or more messages, respectively.

10. The method of claim 1, wherein the audio signature includes an indication of the identity of the user.

11. A server system for handling communication for a computer game, comprising:
    one or more processors; and
    a memory disposed in communication with the one or more processors and storing processor-executable instructions to:
        execute the computer game for game play by a user via a first computing device, the computer game having an interface for recording audio signatures to use during game play based on specific qualifying events;
        detect during game play that a qualifying event has occurred by examining metadata associated with the game play;

generate a message in response to detecting the qualifying event, the message is configured to include an audio signature that was associated with the qualifying event; and transmit the message including the audio signature to a predefined recipient that is playing the computer game via a second computing device, such that the audio signature is output by a speaker associated with the second computing device upon receiving the message.

12. The server system of claim 11, wherein the first computing device and the second computing device play the computer game in a multi-participant mode.

13. The server system of claim 11, wherein the transmitting of the message is a broadcast to the second computing device and at least one other computing device.

14. The server system of claim 11, wherein the qualifying event is associated with an action performed by the user during game play.

15. The server system of claim 14, wherein the action performed by the user during game play includes discharging a pretend weapon, scoring a goal, scoring a basket, scoring a touchdown, accomplishing a task, incapacitating another participant, making contact with another participant, requesting that the audio signature be played to another participant, communicating with another participant, or sending a textual message to another participant.

16. The server system of claim 14, wherein the memory further includes instructions to:

generate one or more additional messages in response to detecting the qualifying event, each of the one or more additional messages configured to include the audio signature associated with the qualifying event; and transmit the one or more messages including the audio signature to one or more additional predefined recipients that are playing the computer game via respective computing devices, the audio signature is output by respective speakers associated with the respective computing devices of the one or more predefined recipients upon receiving the one or more messages, respectively.

17. The server system of claim 11, wherein the audio signature includes an indication of the identity of the user.

18. A non-transitory computer readable storage medium storing a computer program executable by a processor based system, the computer program for handling communication for a computer game, comprising:

program instructions for executing the computer game for game play by a user via a first computing device, the computer game having an interface for recording audio signatures to use during game play based on specific qualifying events;

program instructions for detecting, during game play, that a qualifying event has occurred by examining metadata associated with the game play;

program instructions for generating a message in response to detecting the qualifying event, the message is configured to include an audio signature that was associated with the qualifying event; and program instructions for transmitting the message including the audio signature to a predefined recipient that is playing the computer game via a second computing device, such that the audio signature is output by a speaker associated with the second computing device upon receiving the message.

19. The non-transitory computer readable storage medium of claim 18, wherein the first computing device and the second computing device play the computer game in a multi-participant mode.

20. The non-transitory computer readable storage medium of claim 18, wherein the transmitting of the message is a broadcast to the second computing device and at least one other computing device.

* * * * *